US006661369B1

United States Patent
Cho (10) Patent No.: US 6,661,369 B1
(45) Date of Patent: Dec. 9, 2003

(54) FOCUSING SAR IMAGES FORMED BY RMA WITH ARBITRARY ORIENTATION

(75) Inventor: Kwang M. Cho, Rancho Palos Verdes, CA (US)

(73) Assignee: Raytheon Company, Lexington, MA (US)

( * ) Notice: Subject to any disclaimer, the term of this patent is extended or adjusted under 35 U.S.C. 154(b) by 9 days.

(21) Appl. No.: 10/159,444

(22) Filed: May 31, 2002

(51) Int. Cl.[7] .............................................. G01S 13/89
(52) U.S. Cl. ....................................................... 342/25
(58) Field of Search ............................ 342/25; 382/289, 382/294

(56) References Cited

U.S. PATENT DOCUMENTS

| | | | | |
|---|---|---|---|---|
| 4,370,641 A | * | 1/1983 | Kantor et al. ................ | 382/289 |
| 4,924,229 A | * | 5/1990 | Eichel et al. .................. | 342/25 |
| 5,608,405 A | * | 3/1997 | Pritt .............................. | 342/25 |
| 5,872,870 A | * | 2/1999 | Michael ........................ | 382/291 |
| 5,898,399 A | * | 4/1999 | Carrara et al. ................ | 342/25 |
| 6,011,505 A | * | 1/2000 | Poehler et al. ................ | 342/25 |
| 6,018,306 A | * | 1/2000 | Serbin .......................... | 342/25 |
| 6,256,412 B1 | * | 7/2001 | Miyazawa et al. ........... | 382/216 |

FOREIGN PATENT DOCUMENTS

EP    544280 A1  *  6/1993  ........... G01S/13/90

OTHER PUBLICATIONS

Juan M. Lopez–Sanchez, "3–D Radar Imaging Using Range Migration Techniques", IEEE transactions on antenna and propgation, vol. 48, No. 5, May 2000.*

* cited by examiner

Primary Examiner—Thomas H. Tarcza
Assistant Examiner—Isam Alsomiri
(74) Attorney, Agent, or Firm—Leonard A. Alkov; Glenn H. Lenzen, Jr.

(57) ABSTRACT

A system and method (44) for focusing an image oriented in an arbitrary direction when the collected synthetic aperture radar (SAR) data is processed using range migration algorithm (RMA). In accordance with the teachings of the present invention, first (60) the data is skewed so that the direction of smearing in the image is aligned with one of the spatial frequency axes of the image. In the illustrative embodiment, the smearing is aligned in the vertical direction. This is done through a phase adjustment that was derived from the requirements for proper shift in the spatial frequency domain. Next (62), the signal support areas from all targets are aligned by proper phase adjustment in the spatial (or image) domain. Finally (64), the common phase error can be corrected using autofocus algorithms.

24 Claims, 11 Drawing Sheets

FOCUSING SAR IMAGES FORMED BY RMA WITH ARBITRARY ORIENTATION

BACKGROUND OF THE INVENTION

1. Field of the Invention

The present invention relates to radar signal processing systems. More specifically, the present invention relates to phase error correction in a range migration algorithm (RMA) for synthetic aperture radar (SAR) systems.

2. Description of the Related Art

In imaging applications such as ground mapping, a radar system is used to generate a two-dimensional image of a portion of a ground surface in the range and azimuth (cross-range) directions. A large antenna aperture is required in conventional imaging radar systems in order to achieve a narrow beamwidth and, consequently, fine azimuth resolution. Synthetic aperture radar (SAR) systems have been developed as an alternative means for improving azimuth resolution by synthesizing pulse-to-pulse return signals collected by a moving platform with a small antenna. Signal synthesis from many successive locations of the moving platform accomplishes what would otherwise require a larger antenna aperture.

A polar format algorithm (PFA) has been widely used for high-resolution SAR systems. However, the PFA has the shortcomings of limited depth of focus and geometric distortion that increases with the map size. Range migration algorithm (RMA) is one of the most attractive and advanced SAR processing techniques to avoid the problems with the PFA. A difficulty with the RMA, however, is performing efficient phase correction.

Normal SAR data collection requires phase coherence, not only within each pulse for range resolution, but also from pulse to pulse over the collection time needed for azimuth resolution. The platform position affects the pulse-to-pulse phase coherence over the synthetic aperture. Phase error introduced by the inaccuracy of navigation data or undesirable platform motion causes smearing or duplication of the target image. Since motion compensation at the early processing stage based on the navigation data is not sufficient for producing a focused image, it is a common practice to employ data driven autofocus algorithms in high resolution SAR systems in order to maintain phase coherence and achieve good image quality.

Considering the computational efficiency and simplicity, it is desirable to implement the autofocus function after range compression during batch processing as is usually done for the case of PFA. However, for the case of RMA, it is difficult to implement the autofocus function during batch processing because the signal support areas from different targets are not aligned. For this reason, the autofocus function had to be implemented before batch processing starts, at the cost of increased complexity and processing time.

Because of the difficulty in implementing the autofocus function during batch processing, current RMA systems perform the autofocus function during the pulse-to-pulse processing phase using a separate polar format processing algorithm. This approach, however, has the disadvantage of implementation complexity and tighter processing timeline requirements. Furthermore, the increased timeline requirement makes it more difficult, if not impossible, to implement more advanced autofocus techniques.

In a patent application entitled EFFICIENT PHASE CORRECTION SCHEME FOR RANGE MIGRATION ALGORITHM, application Ser. No. 10/060,647, filed Jan. 30, 2002, by K. M. Cho, the teachings of which are incorporated herein by reference, an efficient phase error correction scheme for RMA is disclosed which allows phase correction to be performed during batch processing. This approach requires the image to be oriented in range-azimuth. However, for current and proposed applications, there is a need for images to be formed in a direction other than range and azimuth.

In the general case when the processed image is oriented in an arbitrary direction especially with RMA, phase correction is more complicated and requires additional processing. A currently used method performs phase correction through separate processing in the pulse-to-pulse phase using PFA. There is no known method for phase correction of arbitrarily oriented images in RMA during batch processing.

Hence, a need exists in the art for an improved system or method for efficient phase error correction of arbitrarily oriented images in a range migration algorithm.

SUMMARY OF THE INVENTION

The need in the art is addressed by the present invention, a system and method for focusing an image oriented in an arbitrary direction when the collected synthetic aperture radar (SAR) data is processed using range migration algorithm (RMA). In accordance with the teachings of the present invention, first the data is skewed so that the direction of smearing in the image is aligned with one of the spatial frequency axes of the image. In the illustrative embodiment, the smearing is aligned in the vertical direction. This is done through a phase adjustment that was derived from the requirements for proper shift in the spatial frequency domain. Next, the signal support areas from all targets are aligned by proper phase adjustment in the spatial (or image) domain. The common phase error is then estimated and corrected using autofocus algorithms. The remaining steps include reverse shifting and deskew processing for the reversal of the processing performed earlier for the alignment of common phase error.

BRIEF DESCRIPTION OF THE DRAWINGS

FIGS. 1c and 1c are illustrations showing the direction of smearing in an image I' oriented in along track-cross track.

FIGS. 11a–11c show the data length variation for the case with minimum spectral data size.

FIGS. 12a–12c show the data length variation for the case with extended spectral data size.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Uncompensated phase error in collected data for synthetic aperture radar (SAR) systems causes image smearing in the azimuth (cross-range) direction. This is due mainly to uncompensated slow motion error that occurs as the Doppler cone angle changes during the time of data collection. When SAR images are formed in the range and azimuth direction, image smearing that occurs in the azimuth direction (usually the vertical axis in the SAR display) can readily be corrected by compensating estimated phase error in the azimuth direction only using various autofocus techniques. However, when the formed image is oriented in a direction different from range and azimuth, the azimuth response that reflects pulse-to-pulse phase variation is not aligned to the vertical axis and image smearing cannot be corrected simply by one-dimensional processing. The direction of smearing is illustrated in FIG. 1 for images oriented in range-azimuth and along track-cross track.

Figures 1A, 1B:
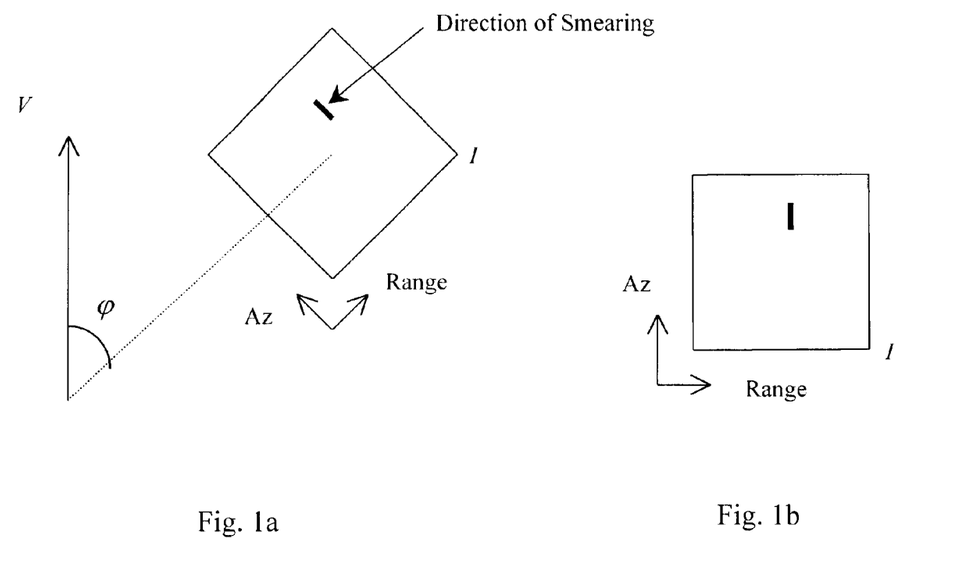
FIGS. 1a and 1b are illustrations showing the direction of smearing in an image I oriented in range-azimuth.

FIGS. 1a and 1b are illustrations showing the direction of smearing in an image I oriented in range-azimuth with a Doppler cone angle φ measured from the along track direction V. The direction of smearing is in the azimuth direction, which is along the vertical axis of the image as shown in FIG. 1b.

Figures 1C, 1D:
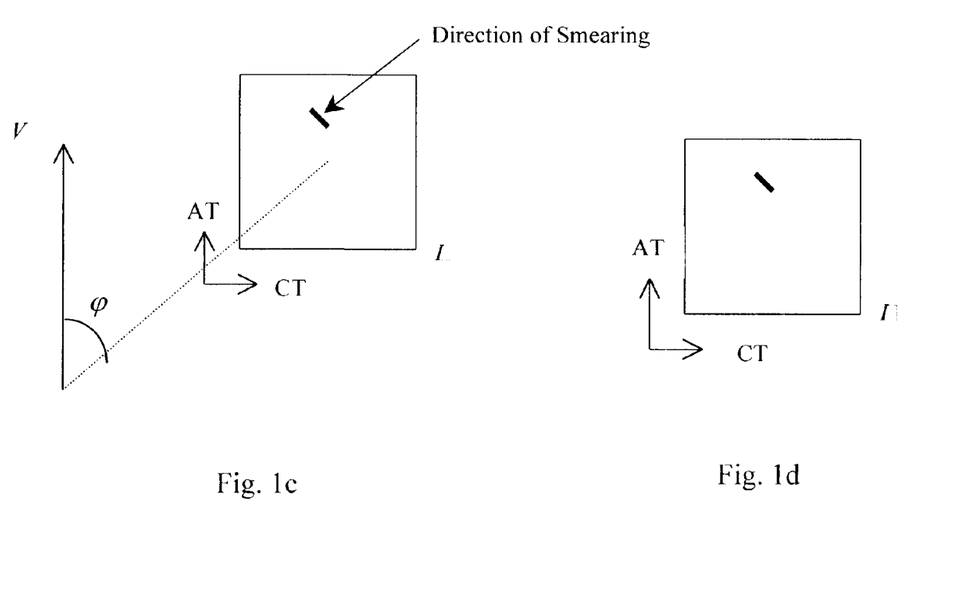

FIGS. 1c and 1c are illustrations showing the direction of smearing in an image I' oriented in along track-cross track (AT-CT) with a Doppler cone angle φ measured from the along track direction V. The direction of smearing is still in the azimuth direction. However, since the image is not oriented in range-azimuth, the direction of smearing is not along the vertical axis of the image as shown in FIG. 1d.

Since the direction of image smearing does not align to that of the image pixels when the images are oriented in a direction other than range and azimuth, direct application of autofocus algorithms in the azimuth direction as conventionally done does not lead to resolving the smearing problem. The proposed method performs a data skew by applying proper phase adjustments so that the direction of smearing is converted to the desirable vertical direction before applying autofocus algorithms. Inverse processing needs to be performed after phase correction using autofocus algorithms. When the range migration algorithm (RMA) is employed for image formation, the common phase errors in the phase history of each target are not aligned because of the shifting of the signal support in the spatial frequency domain that is determined by the azimuth location of the target. Therefore, to estimate and correct the uncompensated common phase error, it is required to shift the signal support for each target so that the common phase error is aligned. Shifting of the signal support for the RMA processing includes basic shifting of signal support and secondary shifting due to the conversion of the smearing direction as mentioned.

Figure 2:
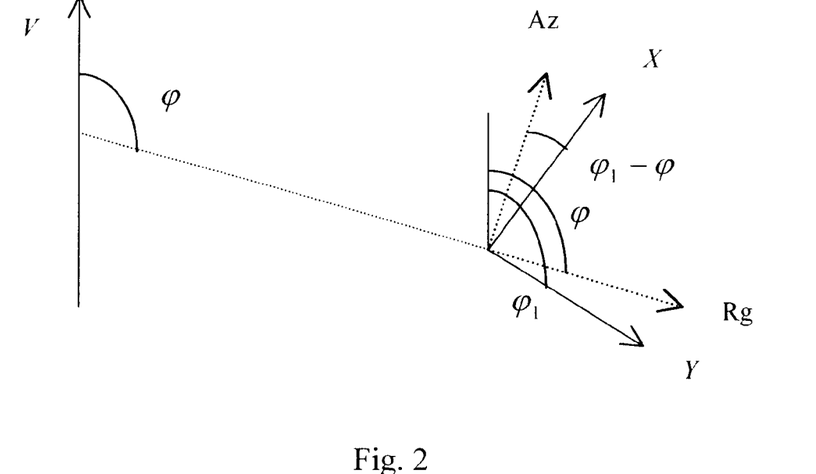
FIG. 2 is an illustration showing a general case that has a Doppler cone angle $\phi$ and an image orientation angle $\phi_1$ from the along-track direction V.

FIG. 2 is an illustration showing a general case that has a Doppler cone angle f and an image orientation angle $\phi_1$ from the along-track direction V. The Y axis of the image is at an angle $\phi_1$ from the along-track direction V, and the X axis of the image is at an angle $\phi_1-\phi$ from the azimuth direction. Since the spectrum corresponding to the processed image in the spatial frequency domain before the last two-dimensional inverse FFT in the image formation processing chain has the same orientation with the image orientation, pulse-to-pulse phase error occurs at an angle $\phi_1-\phi$ from the vertical axis ($K_X$) as indicated in FIG. 3.

Figure 3:
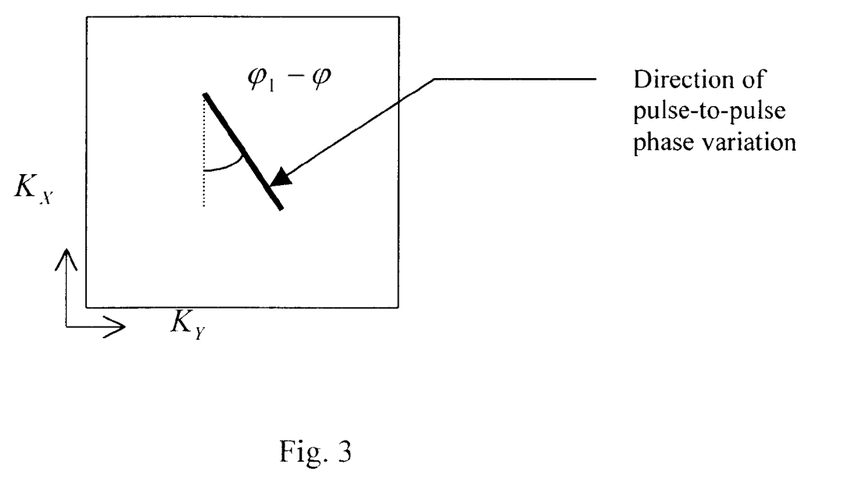
FIG. 3 is an illustration showing the direction of pulse-to-pulse phase variation in the spatial frequency domain.

FIG. 3 is an illustration showing the direction of pulse-to-pulse phase variation in the spatial frequency domain.

Since the pulse-to-pulse phase variation occurs in a direction that couples two axes, the image cannot be focused by one-dimensional phase correction. Therefore, to use one-dimensional phase correction algorithms, it is required to convert the data such that the direction of phase variation can be changed to either the vertical or horizontal direction.

Figure 4:
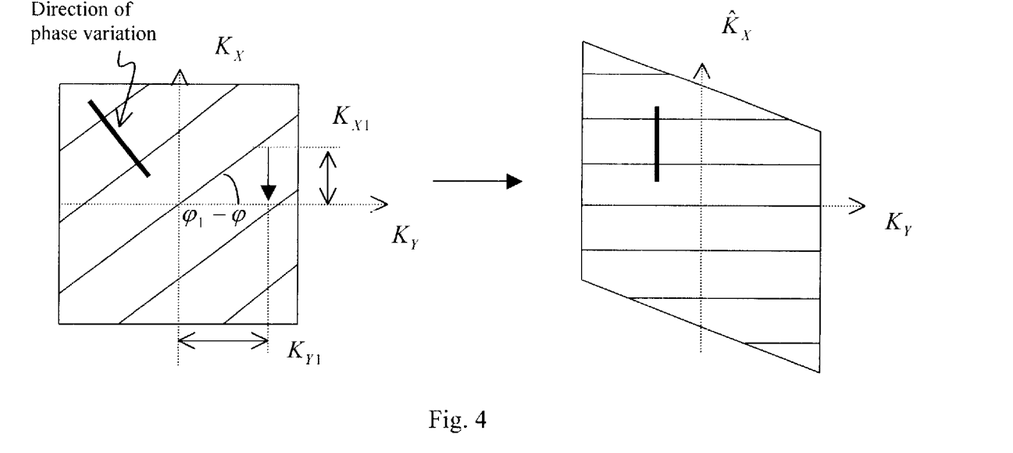
FIG. 4 illustrates the data conversion from $(K_X, K_Y)$ to $(\hat{K}_X, \hat{K}_Y)$ to align the phase error variation to the vertical direction.

FIG. 4 illustrates the data conversion from ($K_X$, $K_Y$) to ($\hat{K}_X$, $\hat{K}_Y$) to align the phase error variation to the vertical direction. To make the phase vary in the vertical direction, the following substitution is required:

$$K_X = \hat{K}_X - \tan(\phi_1-\phi) \cdot K_Y \qquad (1)$$

Although not presented here, this requirement can also be obtained analytically by considering error effect when there is an AT velocity error.

Eq. (1) requires $K_X$ shifted as a function of $K_Y$ and it makes the phase $\hat{\theta}$ changed to:

$$\hat{\theta} = -2\pi(\hat{K}_X \cdot X + K_Y \cdot Y) \qquad (2)$$
$$-2\pi[K_X \cdot X + K_Y \cdot (Y + \tan(\varphi_1 - \varphi) \cdot X)]$$

Therefore, the required phase change from $\theta=-2\pi(K_X X+K_Y Y)$ to $\hat{\theta}=\theta+\Delta\theta$ is:

$$\Delta\theta = -2\pi \tan(\phi_1-\phi)K_Y X \quad (3)$$

The expression for $\hat{\theta}$ also indicates that the added linear phase makes the image shifted in the horizontal (Y) direction as a function of vertical (X) position of targets. Calling this data conversion process by skew process, deskew processing is required after estimating and eliminating phase error that is common to all targets using any autofocus algorithms.

Since supporting spectra corresponding to targets at different azimuth locations are shifted from each other, it is required to perform the proper shift so that phase history from different targets are aligned for the estimation and correction of the common phase error.

Figure 5:
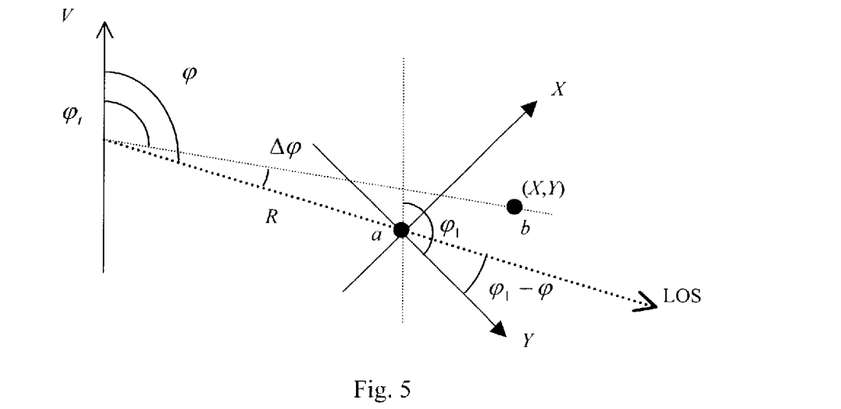
FIG. 5 shows the geometry for an image with arbitrary orientation with targets a and b at the map center (0,0) and at (X,Y), respectively.

FIG. 5 shows the geometry for an image with arbitrary orientation with targets a and b at the map center (0,0) and at coordinates (X,Y), respectively. Target a is located at an angle $\theta$ from the along-track direction V, at a distance R from the radar. Target b is located at an angle $\phi_1$ from the along-track direction V. The mapping geometry in FIG. 5 will be used to derive the required shift correction based on the calculated target angle off line-of-sight (LOS).

Figure 6:
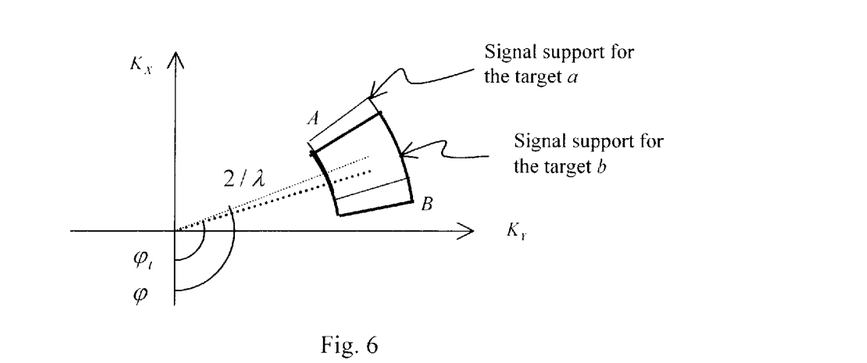
FIG. 6 is an illustration showing the signal support areas A and B corresponding to targets a and b, respectively.

From the expressions for the spatial frequency variables, $K_X = -(2/\lambda)\cos\phi$ and $K_Y = (2/\lambda)\sin\phi$, the signal support for targets at the map center and at (X,Y) can be illustrated as shown in FIG. 6 when the range separation is not that large compared with the mapping range.

FIG. 6 is an illustration showing the signal support areas A and B corresponding to targets a and b, respectively. The signal support areas A and B are shifted by an angle $\phi-\phi_1$. The shifting of the signal support is determined by the azimuth location of the targets.

Since the phase error was changed to align to the vertical ($K_X$) direction as discussed above, shifting of the signal support can be done in the vertical direction.

The angle $\Delta\phi$ between targets a and b as shown in FIG. 5 can be calculated by:

$$\Delta\varphi = \varphi_1 - \varphi = \frac{\sin(\varphi_1-\varphi)\cdot Y - \cos(\varphi_1-\varphi)\cdot X}{R} \quad (4)$$

It should be noted that the spatial frequency in the cross-range direction $K_{AZ}$ varies in the direction of angular change and its shifting for a target off LOS by $\Delta\phi$ is expressed as $\Delta K_{AZ}=2\Delta\phi/\lambda$. Then, the shifting in $K_X$ is given by:

$$\Delta K_X = \cos(\varphi_1-\varphi)\cdot \Delta K_{AZ} = \frac{2\cos(\varphi_1-\varphi)\Delta\varphi}{\lambda} \quad (5)$$

Therefore, the phase adjustment required in the spatial domain to compensate for a shift in $K_X$ is given by:

$$\Delta\Phi_1 = 2\pi\cdot \Delta K_X X \quad (6)$$
$$= \frac{4\pi\cos(\varphi_1-\varphi)\cdot \Delta\varphi\cdot X}{\lambda}$$
$$= \frac{4\pi\cos(\varphi_1-\varphi)}{R\lambda}[\sin(\varphi_1-\varphi)\cdot X\cdot Y - \cos(\varphi_1-\varphi)\cdot X^2]$$

Here, a multiplier is needed to meet the requirement, $$\Delta K_X = \frac{1}{2\pi}\frac{\partial \Delta\Phi_1}{\partial X}.$$

Then $\Delta\Phi_1$ has the expression:

$$\Delta\Phi_1 = \frac{4\pi\cos(\varphi_1-\varphi)}{R\lambda}\left[\sin(\varphi_1-\varphi)\cdot X\cdot Y - \frac{1}{2}\cos(\varphi_1-\varphi)\cdot X^2\right] \quad (7)$$

Figure 7:
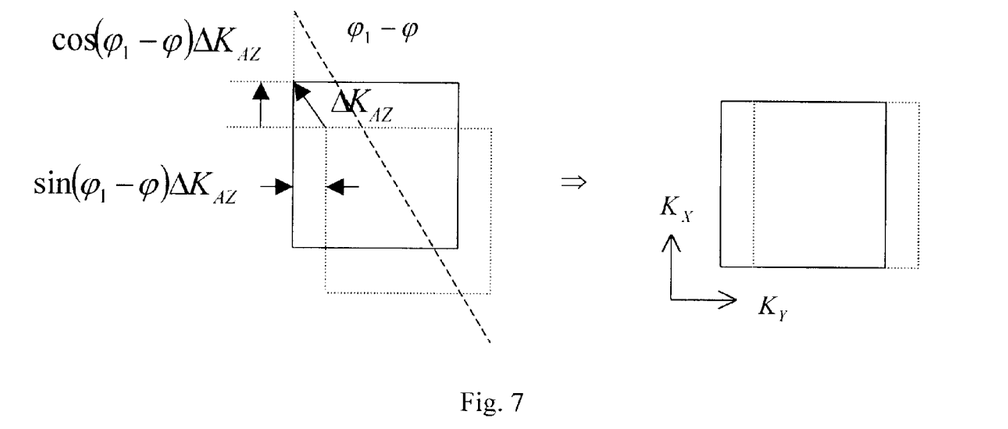
FIG. 7 is an illustration showing the shifting of the signal support in $K_X$ only as a function of target location in cross range.

Application of this phase adjustment makes the signal support in the spatial frequency domain for targets located at different azimuth positions aligned as illustrated in FIG. 7. FIG. 7 is an illustration showing the shifting of the signal support in $K_X$ only as a function of target location in cross range.

An additional phase adjustment is required for $\Delta K_X=\tan(\phi_1-\phi)\Delta K_Y$ in (1) using $\Delta K_Y=2\sin(\phi_1-\phi)\Delta\phi/\lambda$:

$$\Delta\Phi_2 = 2\pi\cdot \Delta K_X X \quad (8)$$
$$= 2\pi\tan(\varphi_1-\varphi)\Delta K_Y X$$
$$= \frac{4\pi\tan(\varphi_1-\varphi)\sin(\varphi_1-\varphi)}{R\lambda}[\sin(\varphi_1-\varphi)\cdot X\cdot Y - \cos(\varphi_1-\varphi)\cdot X^2]$$

Combining the expressions in (7) and (8), the following result is obtained for total phase adjustments:

$$\Delta\Phi = \Delta\Phi_1 + \Delta\Phi_2 \quad (9)$$
$$= \frac{4\pi}{R\lambda}\left[X\cdot Y\cdot \tan(\varphi_1-\varphi) - X^2\cos^2(\varphi_1-\varphi)\left(\frac{1}{2}+\tan^2(\varphi_1-\varphi)\right)\right]$$

Applying this phase function in the spatial domain will make the shifted spectra aligned so that the common phase error can be estimated and compensated.

The present invention provides a system and method for efficient phase error correction in RMA for images with arbitrary orientation. First, the proposed method performs data skew by applying the proper phase adjustment, as discussed above, so that the direction of smearing is converted to the desirable vertical direction. Second, the signal support for each target is shifted so that the common phase error is aligned. The shifting of the signal support includes both basic shifting of signal support and secondary shifting due to the conversion of the smearing direction as discussed above. Then, the common phase error can be corrected using known autofocus algorithms. Reverse processing of the previously performed phase adjustments needs to be performed after phase correction.

Figure 8:
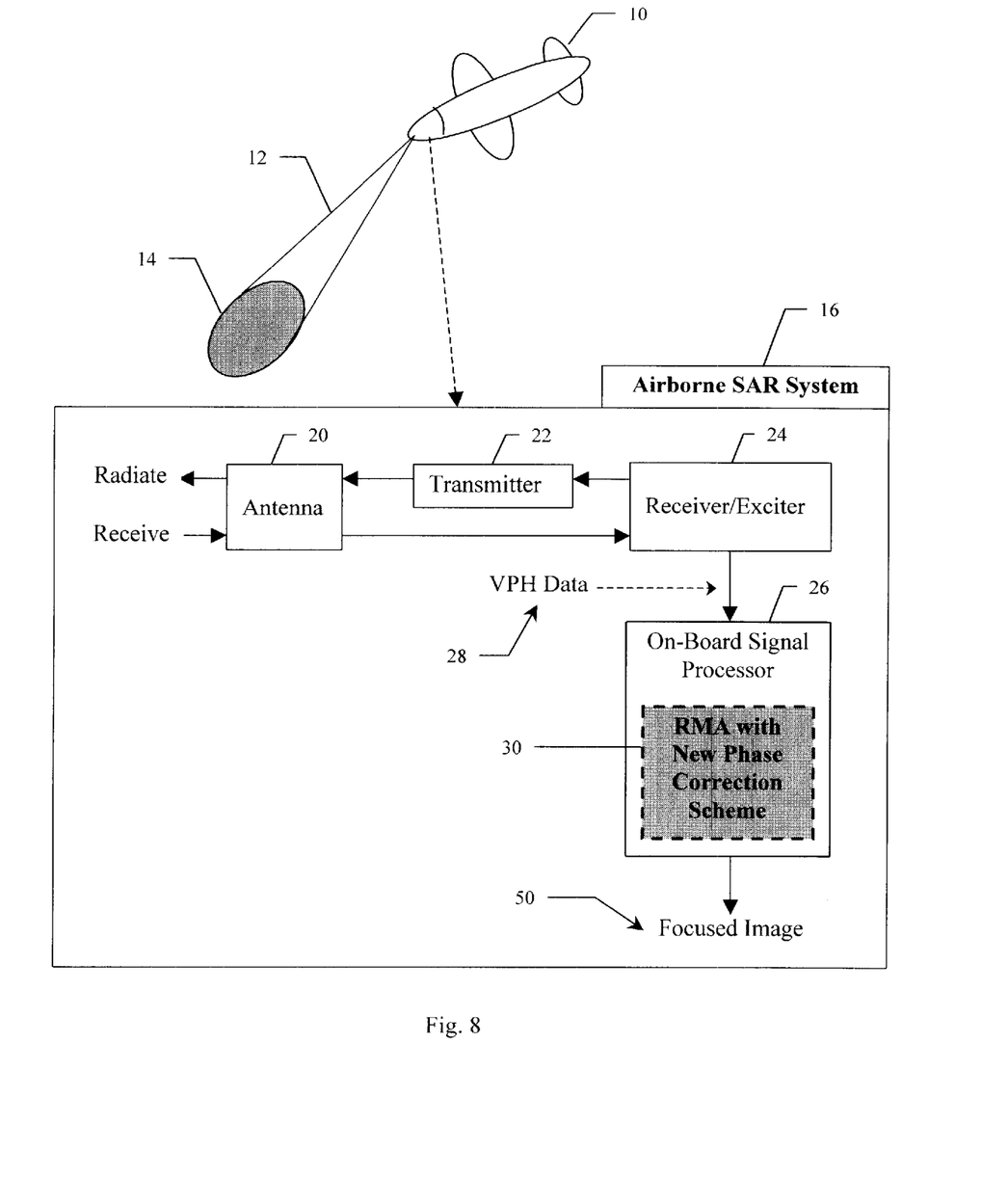
FIG. 8 is a simplified block diagram of an airborne SAR system using RMA with the new phase correction scheme in accordance with the teachings of the present invention.

FIG. 8 is a simplified block diagram of an airborne SAR system using RMA with the new phase correction scheme in accordance with the teachings of the present invention. A SAR system 16 mounted on an aircraft 10 generates an electromagnetic wave 12 which is reflected off a ground surface 14 and received by the SAR system 16. The SAR system 16 includes an antenna 20, a transmitter 22, and a receiver 24 for radiating and receiving the electromagnetic waves. The receiver 24 forms input video phase history (VPH) data 28 from the received data and sends it to an on-board signal processor 26. Residing in the signal processor 26 is a range migration algorithm 30 with the new phase correction scheme of the present teachings, which outputs a focused image 50.

Figure 9:
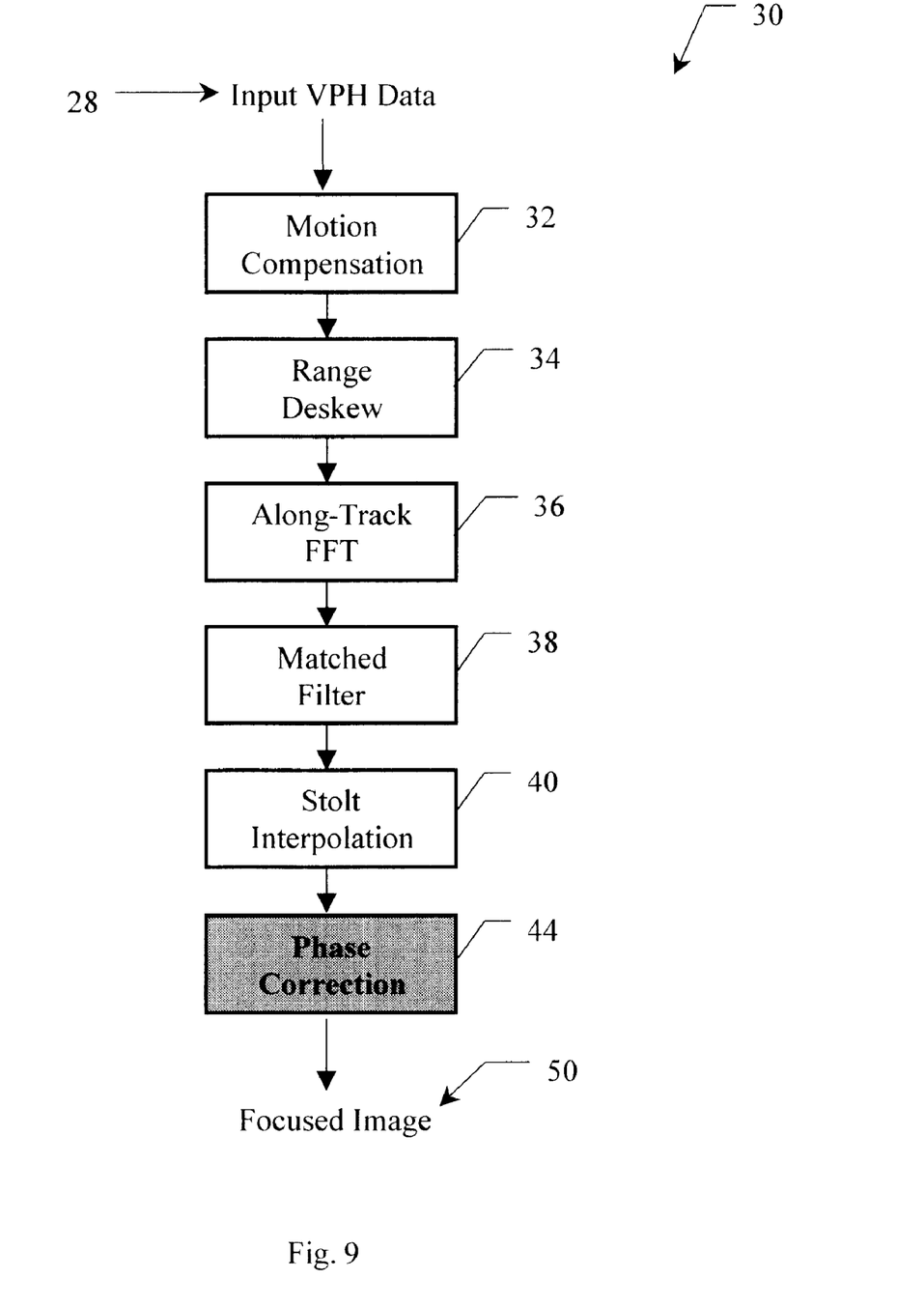
FIG. 9 is a simplified block diagram showing the basic components of RMA and where the new phase correction scheme should be inserted in accordance with the teachings of the present invention.

FIG. 9 is a simplified block diagram showing the basic components of RMA and where the new phase correction scheme should be inserted in accordance with the teachings of the present invention. The basic components of RMA are well known in the art. The input VPH data 28 is successively passed through a Motion Compensation function 32, a Range Deskew function 34, an Along-Track FFT 26, a Matched Filter 38, and a Stolt Interpolation 40. The new phase correction scheme 44 is inserted after the Stolt Interpolation 40, generating a final focused image 50.

Figure 10:
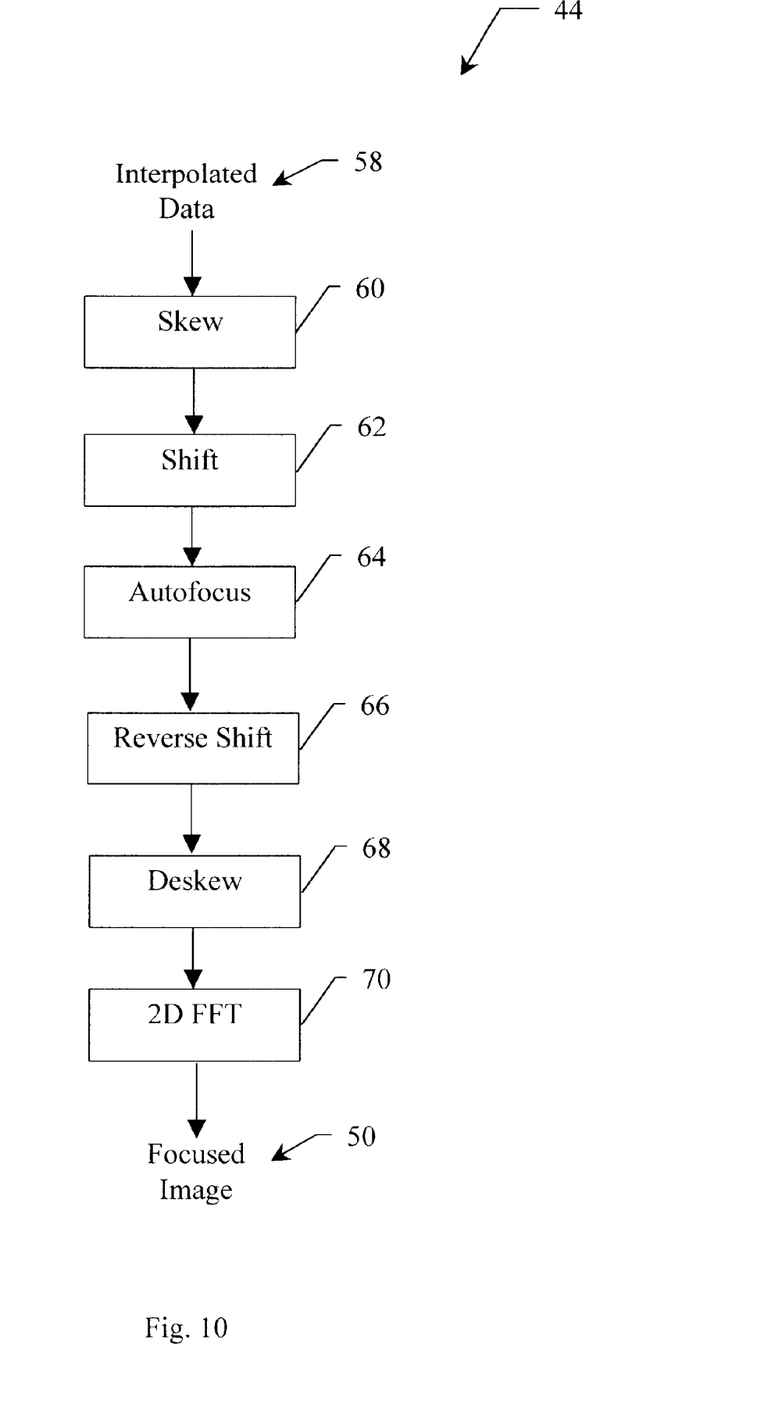
FIG. 10 is a simplified block diagram showing the basic components of the new phase correction scheme in accordance with the teachings of the present invention.

FIG. 10 is a simplified block diagram showing the basic components of the new phase correction scheme 44 in accordance with the teachings of the present invention. Interpolated data 58 output from the Stolt Interpolation 40 is first passed through a Skew function 60, followed by a Phase Shift 62, and an Autofocus function 64. After Autofocus 64, a Reverse Shift 66 and Deskew 68 are applied. Finally, a 2D FFT 70 is applied to form a focused image 50.

The proposed phase correction method needs to be implemented in the spatial frequency domain after the Stolt Interpolation 40. Proper zero padding is required to avoid the wrap-around effect in the process of performing FFT functions. In taking input data after the Stolt interpolation, there are two cases. The first case is when the interpolated data in the spatial frequency domain ($K_X$, $K_Y$) has the minimum size in $K_X$ that is required for the desired resolution. Since phase error is estimated using the shifted spectra of each target, the estimated phase error in this case may be less accurate around the azimuth edge in the spatial frequency domain. The second case is when the interpolated data in the spatial frequency domain has extra length in $K_X$ so that the overlapped area is big enough for phase correction of the desired length during and after forward and backward shifting. These two cases will be discussed first before presenting detailed functional steps.

Figure 11A:
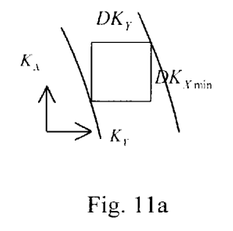
FIG. 11a shows the interpolated data after the Stolt interpolation in the ($K_X$, $K_Y$) domain.
Figure 11B:
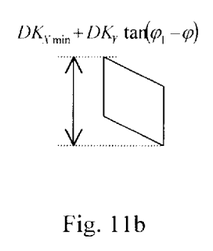
FIG. 11b shows the data position after data skewing to change smearing to the vertical direction.
Figure 11C:
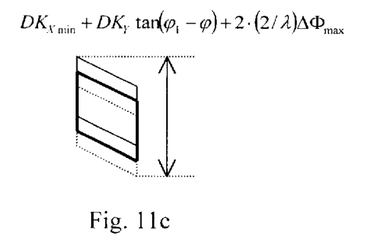
FIG. 11c shows the data position after data shifting in $K_X$.

FIGS. 11a–11c show the data length variation for the case with minimum spectral data size. FIG. 11a shows the interpolated data after the Stolt interpolation in the ($K_X$, $K_Y$) domain. The data lengths in $K_X$ and $K_Y$ are $DK_{Xmin}$ and $DK_Y$, respectively.

FIG. 11b shows the data position after data skewing to change smearing to the vertical direction. The data length in $K_X$ becomes $DK_{Xmin} + DK_Y \tan(\phi_1 - \phi)$.

FIG. 11c shows the data position after data shifting in $K_X$. The data length in $K_X$ becomes $DK_{Xmin} + DK_Y \tan((\phi_1 - \phi) + 2(2/\lambda)\Delta\Phi_{max}$. Because of the position dependent shifting, not all targets can provide phase information that is required for the estimation and correction of the common phase error in the initial spectral area. Therefore, in this case, there may be some degree of degradation in phase correction performance. However, this case offers a computational advantage when spatially variant apodization (SVA) is employed since one forward and one backward FFT functions in the last stage of processing in the other case are not required.

In the previous case, uncovered spectral regions due to target dependent shifting leads to degradation of phase correction performance. This can be avoided by taking spectral data with extended length.

Figure 12A:
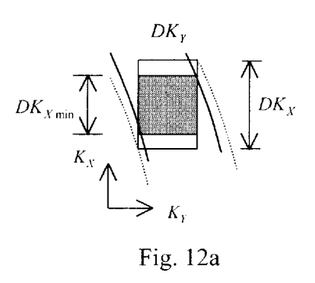
FIG. 12a shows the interpolated data after the Stolt interpolation in the ($K_X$, $K_Y$) domain.
Figure 12B:
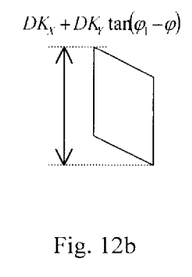
FIG. 12b shows the data position after data skewing to change smearing to the vertical direction.
Figure 12C:
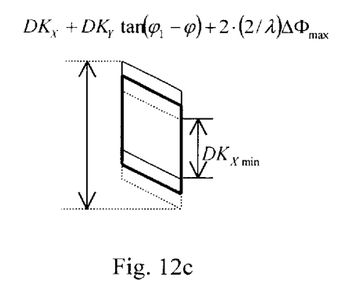
FIG. 12c shows the data position after data shifting in $K_X$.

FIGS. 12a–12c show the data length variation for the case with extended spectral data size. FIG. 12a shows the interpolated data after the Stolt interpolation in the ($K_X$, $K_Y$) domain. The data lengths in $K_X$ and $K_Y$ are $DK_X$ and $DK_Y$, respectively, where $DK_X = DK_{Xmin} + 2(2/\lambda)\Delta\Phi_{max}$.

FIG. 12b shows the data position after data skewing to change smearing to the vertical direction. The data length in $K_X$ becomes $DK_X + DK_Y \tan(\phi_1 - \phi)$.

FIG. 12c shows the data position after data shifting in $K_X$. The data length in $K_X$ becomes $DK_X + DK_Y \tan(\phi_1 - \phi) + 2(2/\lambda)\Delta\Phi_{max}$. Since phase information from every target in the mapping area is available after spectral shifting, phase correction performance should be better than the case with the minimum spectral size. There is still a small area that is not covered by the data collection as indicated in the first spectral rectangle in FIG. 12a. If desired, this can be avoided by taking extra samples in $K_Y$ as indicated by dotted lines.

Figure 13A:
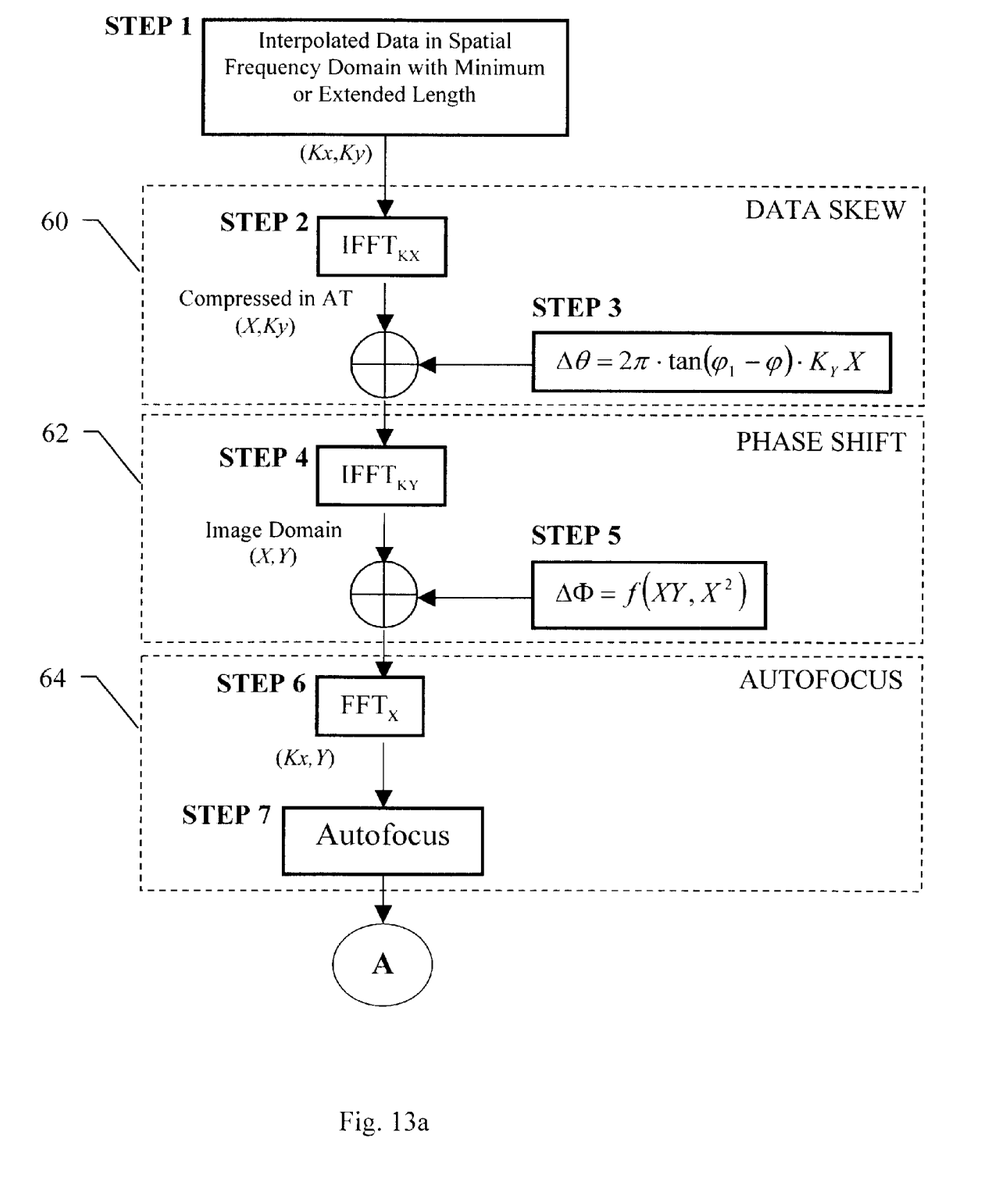
FIGS. 13a and 13b are flow diagrams of the new phase correction algorithm in accordance with the teachings of the present invention. The flow chart begins in FIG. 13a and is continued in FIG. 13b.
Figure 13B:
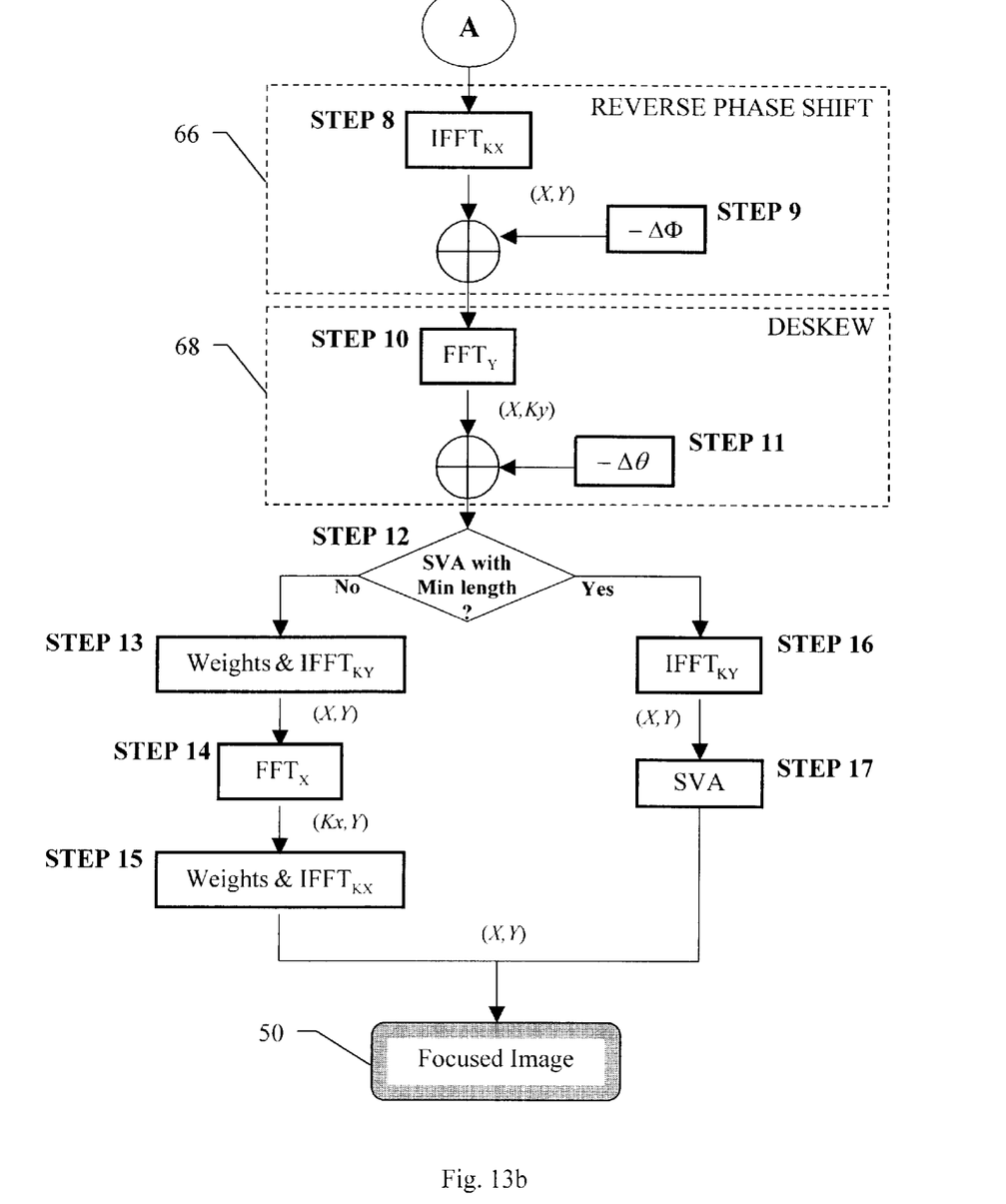

FIGS. 13a and 13b are flow diagrams of the new phase correction algorithm in accordance with the teachings of the present invention. The flow chart begins in FIG. 13a and is continued in FIG. 13b.

In STEP 1, data from the Stolt interpolation is taken as input. As discussed earlier, there are two cases with different sizes of spectra. The desired resolution $\delta_X$ determines the required minimum length $DK_{Xmin}$ of the interpolated data in the spatial frequency domain: $DK_{Xmin} = k_X/\delta_X$ for the main-lobe broadening factor $k_X$. Taking more data than the required minimum allows more target phase information and therefore better phase estimation. Extended data length on each side can be calculated by the following expression derived from Eqn. (9):

$$\Delta K_X = \frac{2\Delta\Phi}{2\pi \cdot X}\bigg|_{X=W_X/2, Y=W_Y/2} \quad (10)$$
$$= \frac{2}{R\lambda}\left[W_Y \tan(\varphi_1 - \varphi) - W_X \cos^2(\varphi_1 - \varphi)\left(\frac{1}{2} + \tan^2(\varphi_1 - \varphi)\right)\right]$$

Here $W_X$ and $W_Y$ are the image size in each direction. Data length for the case of extended input can be expressed by $DK_X = DK_{Xmin} + 2\Delta K_X$.

In STEP 2, an inverse Fast Fourier Transform (IFFT) function in $K_X$ is applied to the data to convert it to the spatial domain so that the phase adjustment $\Delta\theta$ in Eqn. (3) can be applied in STEP 3 for shifting in $K_X$ as a function of $K_Y$. After this step, the data is in the (X, $K_Y$) domain.

In STEP 3, the phase adjustment $\Delta\theta$ in Eqn. (3) is applied. Application of this phase in the (X, $K_Y$) domain is for skewing the data to make the angled smearing aligned to the vertical direction.

In STEP 4, an inverse Fast Fourier Transform (IFFT) in $K_Y$ is applied to convert the data to the image (X, Y) domain so that the phase adjustment in STEP 5 can be performed to align the shifted common phase error as a function of azimuth position.

In STEP 5, the phase adjustment function $\Delta\Phi$ expressed in Eqn. (9) is applied to align the shifted target spectra so that the common phase error can be properly estimated and corrected using an autofocus function in STEP 7.

In STEP 6, a forward FFT function in X is applied to convert the data in X to $K_X$ so that the common phase error can be estimated and corrected by the subsequent autofocus function (STEP 7). After this step, the data is in the ($K_X$, Y) domain.

In STEP 7, any parametric or non-parametric autofocus algorithm or combination of algorithms can be applied to estimate and correct the phase error common to all targets using the shift-corrected range compressed data in the $K_X$ domain.

In STEP 8, an inverse FFT in $K_X$ is applied to convert the phase corrected data to the image (spatial) domain so that a reverse phase shift ($-\Delta\Phi$) can be applied in STEP 9 to restore the shifted signal support.

In STEP 9, the inverse function ($-\Delta\Phi$) of the phase adjustment performed earlier (STEP 5) is applied to shift back the signal support that is dependent on the target azimuth location.

In STEP 10, a forward FFT function in Y is applied to convert data from Y to $K_Y$ so that the deskew function ($-\Delta\theta$) in STEP 11 can be applied. After this step, the data is in the (X, $K_Y$) domain.

In STEP 11, a deskew phase function (−Δθ) is applied to shift back the shifted image in Y for a given position in X, reversing the skew function applied in STEP 3.

In STEP 12, if SVA is used with the input spectrum of minimum length, go to STEP 16; otherwise, go to STEP 13.

In STEP 13, weights and an inverse FFT in $K_Y$ are applied to compress the data in Y. After this step, the data is in the image domain (X, Y).

In STEP 14, a forward FFT in X is applied to convert the data to $K_X$ so that data of the correct size is taken and a weighting function can be applied.

In STEP 15, weights and an inverse FFT in $K_X$ are applied to compress the data in X, forming a final focused image 50.

If SVA is used with the input spectrum of minimum length, processing steps can be reduced.

In STEP 16, an inverse FFT in $K_Y$ is applied to compress the data in Y without weighting so that SVA can be applied in STEP 17. After this step, the data is in the image domain (X, Y).

In STEP 17, a two dimensional SVA is applied to reduce the sidelobe level while maintaining the mainlobe width minimum. The SVA function outputs a final focused image 50.

Phase correction becomes much simpler when the processed image is oriented in the range-azimuth direction. This is because there is no need to include the phase adjustment by Δθ to align the direction of smearing to the vertical. As a result, steps 3, 10, 11, 13, and 16 in FIG. 13 can be eliminated. Since ($\phi_1$−$\phi$) is zero, ΔΦ that is expressed in Eqn. (9) is not a function of the range variable Y any more. Simplified processing steps with these adjustments from FIG. 13 are illustrated in FIG. 14.

Figure 14:
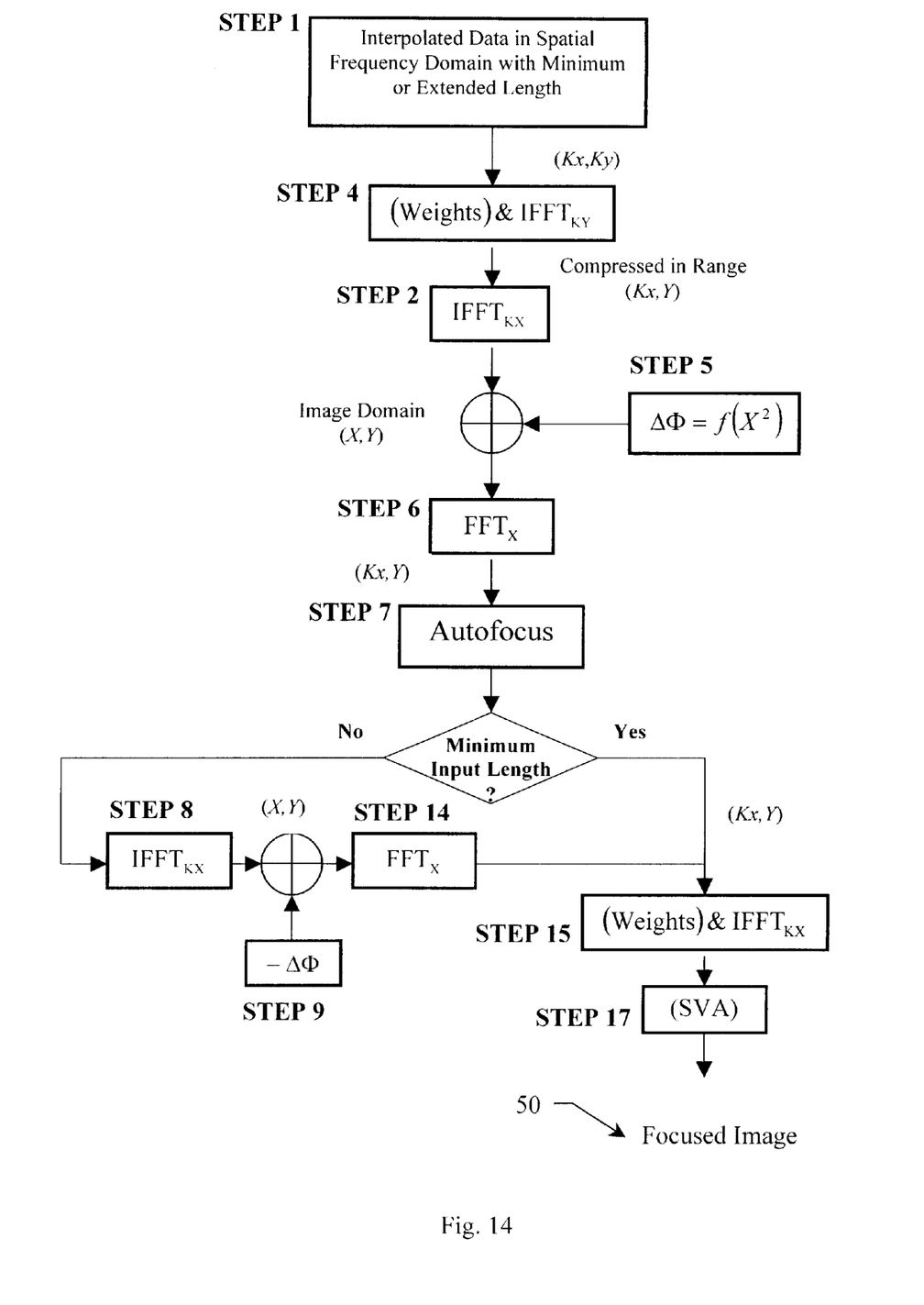
FIG. 14 is a flow chart of a particular embodiment of the present invention showing the simplified processing sequence for focusing RMA-based SAR images oriented in range-azimuth.

FIG. 14 is a flow chart showing the simplified processing sequence for focusing RMA-based SAR images oriented in range-azimuth. The sequence is similar to that of FIG. 13 with STEPS 3, 10, 11, 13, and 16 eliminated. After autofocusing (STEP 7), if the input data was of extended length, then STEPS 8, 9 and 14 are performed. Otherwise, those steps are skipped. Then STEPS 15 and 17 are applied, generating the final focused image 50.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for focusing an image oriented in an arbitrary direction collected by a synthetic aperture radar (SAR) system with multiple targets having corresponding signal support areas comprising:

first means for skewing said image;

second means for aligning said signal support areas from all targets after said image has been skewed; and third means for correcting common phase error after said signal support areas have been aligned.

2. The invention of claim 1 wherein said skewing aligns the direction of smearing in the image with one of the spatial frequency axes of the image.

3. The invention of claim 2 wherein said axis is the vertical axis.

4. The invention of claim 1 wherein said first means includes:

fourth means for converting input data to the (X, $K_Y$) domain, and fifth means for applying a phase adjustment to said converted data.

5. The invention of claim 4 wherein said phase adjustment is given by $\Delta\theta = -2\pi \tan(\phi_1-\phi)K_Y X$, where $\phi$ is the Doppler cone angle and $\phi$ is the image orientation angle measured from the along-track direction.

6. The invention of claim 4 wherein said fourth means includes an inverse Fast Fourier Transform.

7. The invention of claim 1 wherein said second means includes:

sixth means for converting skewed data to the spatial domain (X, Y), and seventh means for applying a phase shift to the resulting spatial domain data.

8. The invention of claim 7 wherein said phase shift is given by:

$$\Delta\Phi = \frac{4\pi}{R\lambda}\left[X \cdot Y \cdot \tan(\varphi_1 - \varphi) - X^2\cos^2(\varphi_1 - \varphi)\left(\frac{1}{2} + \tan^2(\varphi_1 - \varphi)\right)\right],$$

where λ is the wavelength of the transmitted radar signal and R is the distance from the radar platform to the image center.

9. The invention of claim 7 wherein said sixth means includes an inverse Fast Fourier Transform.

10. The invention of claim 1 wherein said third means includes:

eighth means for converting phase shifted data to the ($K_X$, Y) domain, and ninth means for applying an autofocus function to said converted data.

11. The invention of claim 10 wherein said eighth means includes a Fast Fourier Transform.

12. The invention of claim 1 wherein said system further includes tenth means for shifting said signal support areas back to their initial positions after phase error has been corrected.

13. The invention of claim 12 wherein said tenth means includes:

eleventh means for converting phase corrected data to the spatial domain (X,Y), and twelfth means for shifting the phase of the resulting spatial domain data.

14. The invention of claim 13 wherein said eleventh means includes a Fast Fourier Transform.

15. The invention of claim 1 wherein said system further includes thirteenth means for deskewing the image to return the data to its original position.

16. The invention of claim 15 wherein said thirteenth means includes:

fourteenth means for converting phase corrected data to the (X,$K_Y$) domain, and fifteenth means for applying a reverse phase adjustment to the converted data.

17. The invention of claim 16 wherein said fourteenth means includes a Fast Fourier Transform.

18. The invention of claim 1 wherein said system further includes sixteenth means for generating a final focused image from said phase corrected data.

19. The invention of claim 18 wherein the image input to the system has an extended length greater than the minimum data length required for the desired resolution.

20. The invention of claim 19 wherein said sixteenth means includes:

means for applying weights and an inverse Fast Fourier Transform in $K_Y$, generating data in the image (X, Y) domain;

means for converting said image domain data to the ($K_X$, Y) domain; and means for applying weights and an inverse Fast Fourier Transform in $K_X$, generating a final focused image.

21. The invention of claim 18 wherein the image input to the system has the minimum data length required for the desired resolution.

22. The invention of claim 21 wherein said sixteenth means includes:

means for converting said phase corrected data to image (X, Y) domain, and means for applying a two dimensional Spatially Variant Apodization function, generating a final focused image.

23. A system for focusing an image oriented in an arbitrary direction collected by a synthetic aperture radar (SAR) system with multiple targets having corresponding signal support areas comprising:

an antenna for transmitting and receiving electromagnetic energy;

a transmitter for sending transmit information to said antenna;

a receiver for processing said received electromagnetic energy; and a signal processor with a range migration algorithm containing a phase correction system adapted to execute:

a first function for skewing the image data;

a second function for aligning the signal support areas from all targets after the data has been skewed; and a third function for correcting common phase error after said signal support areas have been aligned.

24. A method for focusing an image oriented in an arbitrary direction collected by a synthetic aperture radar (SAR) system with multiple targets having corresponding signal support areas including the steps of:

skewing said image;

aligning said signal support areas from all targets after said image has been skewed; and correcting common phase error after said signal support areas have been aligned.

* * * * *